United States Patent [19]
Beschke et al.

[11] 3,917,542

[45] Nov. 4, 1975

[54] CATALYST FOR THE PRODUCTION OF PYRIDINE AND 3-METHYLPYRIDINE

[75] Inventors: Helmut Beschke; Axel Kleemann; Gerd Schreyer, all of Grossauheim, Germany

[73] Assignee: Deutsche Gold- und Silber-Scheideanstalt Vormals Roessler, Germany

[22] Filed: Aug. 8, 1973

[21] Appl. No.: 386,570

[30] Foreign Application Priority Data
Aug. 12, 1972 Germany............................ 2239801

[52] U.S. Cl. .............................. 252/442; 260/290 P
[51] Int. Cl.² ............................................ B01J 27/12
[58] Field of Search .......... 252/441, 442; 260/290 P

[56] References Cited
UNITED STATES PATENTS

| | | | |
|---|---|---|---|
| 2,289,375 | 7/1942 | Mattox | 252/442 X |
| 2,364,114 | 12/1944 | Veltman | 252/442 |
| 2,400,446 | 5/1946 | Veltman | 252/442 X |
| 2,602,772 | 7/1952 | Haeusel | 252/442 X |
| 3,271,300 | 9/1966 | Baker et al. | 252/442 X |

FOREIGN PATENTS OR APPLICATIONS 1,222,971 2/1971 United Kingdom

*Primary Examiner*—Patrick P. Garvin
*Attorney, Agent, or Firm*—Cushman, Darby & Cushman

[57] ABSTRACT

Compounds of Al, F and O and at least one element of the second main group of the periodic system are heated at 550° to 1200° C. to render them suitable as catalysts for the reaction of acrolein with ammonia to form pyridine and 3-methylpyridine.

15 Claims, No Drawings

CATALYST FOR THE PRODUCTION OF PYRIDINE AND 3-METHYLPYRIDINE

The invention is directed to catalysts for the reaction of acrolein with ammonia to form pyridine and 3-methylpyridine (beta-picoline).

There are numerous processes known for the production of pyridine and methylpyridine from acrolein and ammonia. They differ essentially in the particular catalysts used. As catalysts there have been used aluminum silicates, East German Pat. No. 58,960 or zeolitic molecular sieves containing lanthanum, German Offenlegungsschrift No. 2,023,158. There have also been added as catalysts substances which consist of mixtures of aluminum oxide and silicon dioxide, in a given case with the addition of boric acid and phosphoric acid and oxides of the elements magnesium, zirconium, zinc, thorium, copper, iron, cobalt, titanium, lead, cadmium and chromium (Netherlands published application No. 6,806,599) or with fluoride impregnated aluminum oxides and/or silicon dioxides, in a given case with additions of oxides of the elements magnesium, zirconium, zinc, thorium, copper, iron, cobalt, titanium, lead, cadmium, silver or chromium (Netherlands published application No. 6,806,562), or of oxides of beryllium, calcium and barium, in a given case on a carrier of aluminum oxide and/or silicon dioxide (Netherlands patent application No. 6,806,619) or of fluosilicic or fluoboric acid on an aluminum oxide and/or silicon dioxide carrier (German Offenlegungsschrift No. 1,917,037). These substances are preheated to temperatures of 400 to 450°C. All known processes result in small space-time yields.

There have now been found catalysts for the production of pyridine and 3-methylpyridine by reaction of acrolein with ammonia which consist of compounds of the elements Al, F and O and at least one element of the second main group of the periodic system which have been pretreated with oxygen at temperatures of 550° to 1,200°C. Surprisingly, by using these catalysts very high space-time yields result.

The catalysts of the invention contain besides the elements Al, F and O at least one element of the second main group of the periodic system, especially Mg, Ca, Sr or Ba.

For the production of the catalysts of the invention, first of all, there are suited mixtures which are prepared from the corresponding element containing starting materials and these are then treated with oxygen at temperatures of 550° to 1,200°C.

The aluminum is generally added as the oxide. However, it can also be added as the metal or customary compounds of aluminum, insofar as they can be converted into aluminum oxide, as for example, salts such as aluminum nitrate or aluminum acetate. The elements of the second main group of the periodic system which provide the further constituents of the catalyst can also be used as the oxides, e.g., MgO, SrO, CaO and BaO. They can also be added as the elements themselves or any desired compounds of the elements insofar as they can be changed to the oxygen compounds. These compounds are especially salts which can be decomposed by heating, as for example, the nitrates, acetates and oxalates, e.g., calcium nitrate, calcium acetate, calcium oxalate, barium acetate, barium nitrate, strontium nitrate, magnesium acetate, magnesium nitrate and magnesium oxalate.

The fluorine is added as a solid, liquid or gaseous compound, especially as a compound which is soluble or hydrolyzable in water. For example, there can be used ammonium fluoride, ammonium hydrogen fluoride and hydrofluoric acid (HF). It can be advantageous to add one of the elements of the second main group as a fluorine compound. Such compounds include, for example, magnesium fluoride, calcium fluoride, strontium fluoride and barium fluoride.

The mixtures of starting materials generally are so chosen that the atomic proportions of Al to F are between 1,000 to 10 and 1,000 to 800, preferably between 1,000 to 20 and 1,000 to 400. The atomic proportions of aluminum to the elements of the second group calculated together suitably is between 1,000 to 5 and 1,000 to 200, preferably between 1,000 to 10 and 1,000 to 100.

There are many possibilities for the preparation of the mixtures of starting materials. Which method of operation to use depends in general on the type of substance. Even if the different compound can be brought together in any desired sequence, it has proven advantageous at times to add the fluorine containing compound last. It is suitable to add one or more of the materials as an aqueous solution or slurry in water and to evaporate these water containing mixtures to dryness or to dry them at temperatures between 100° and 200°C. to recover the catalyst substance.

For example, the aluminum oxide as a powder, granules or molded to pressed articles such as tablets or balls can be mixed with aqueous solutions of the other materials. There can also be employed an aqueous solution of aluminum compounds and the aluminum precipitated from this as the hydroxide. Before, during or after the precipitation, in a given case in portions, there can be added the other materials. In the case where gaseous fluoride compounds are used, the aluminum oxide or mixtures of this with other substances, suitably in the presence of moisture, can be gassed with the fluorine compound. Furthermore, it can be advantageous first to mix two of the substances with each other with the use of water and these mixtures then evaporate to dryness before adding a further material.

The mixtures thus prepared are heated to temperatures between 550° and 1,200°C. and are treated at these temperatures for some time in the presence of oxygen. The method, temperature and time of treatment used for this treatment depends on the type of starting material and methods used for preparation of the mixtures.

The mixtures can be directly heated to the treatment temperature. However, it can be advantageous to first only heat the mixtures moderately and to slowly increase the temperature, in a given case in the course of several hours, uniformly or preferably stepwise to the treatment temperature between 550° and 1,200° C.

For the real treatment with oxygen the mixtures are heated to temperatures between 550° and 1,200° C., preferably between 600° and 800°C. It can be advantageous to treat the mixtures successively at different temperatures within this range. Thereby there can be chosen either increases or decreases in temperature. The treatment seldom takes over a total of 20 hours and in most cases about 2 to 10 hours. Generally, air is used as the source of oxygen, but there can be used pure oxygen or mixtures of oxygen with inert gases, e.g., nitrogen, argon, helium, neon, etc.

In the case where there is not started with the oxides or other oxygen containing compounds, the treatment with oxygen forms the corresponding compounds. However, the change in these compounds can also take place entirely or partially before or during the preparation of the mixtures.

A preferred method of operation is to treat aluminum oxide which has a surface area (BET) between 80 and 400 m²/g, especially a surface area (BET) between 200 and 350 m²/g and in a given case present in the form of molded articles, with an aqueous solution of the nitrate or oxalate of the other element concerned to dry this mixture by heating to about 100° C., to treat the dry material with an aqueous solution of a fluorine compound, to dry this mixture by heating to about 100° C. and subsequently to treat this dry substance for 3 to 10 hours at 600° to 800 °C. with oxygen.

It has proven especially effective to use the aluminum oxide in the form of extruded objects having a diameter of 1 to 3 mm., a length of 4 to 6 mm., a surface area (BET) of 200 to 350 m², a pore volume of 30 to 60 ml/100 grams, an average pore diameter of 50 to 200 A. and a breaking strength (ultimate strength) of 1 to 10 kgf (kilograms force). An aluminum oxide having these properties for example is the product GFS 300 of the company PechineySaint Gobain.

The catalysts are suitable for use in fixed beds or fluidized beds and accordingly are added, for example in the form of molded objects or in granular form.

The reaction of the acrolein with ammonia to form pyridine and 3-methylpyridine using the catalysts of the invention is carried out in customary manner in the gas phase. It is carried out chiefly at normal pressure or at slight excess pressure up to about 3 atmospheres at temperatures between 300° and 500° C., preferably between 350° and 450° C. The proportions of ammonia to acrolein are generally so chosen that there is present more ammonia than is required according to the stoichiometry of 0.5 mole ammonia per mole of acrolein. There is chiefly used between 1 and 10 moles of ammonia, preferably between 1 and 3 moles of ammonia per mole of acrolein. Ammonia and acrolein are added advantageously in diluted form. As diluents there can be used for example, nitrogen, air, oxygen, steam or organic carrier gases, such as benzene. In a given case, the reaction can be regulated to favor the formation of pyridine or methyl pyridine by controlling the oxygen content in the gaseous mixture. At a content of 1 to 4 moles of oxygen per mole of acrolein the formation of pyridine is preferred, at a lesser oxygen content the formation of 3-methylpyridine is preferred. When a foreign gas is added it can be about 5 to 80 volume % of the total gas mixture. Advantageously, the acrolein is first diluted with the foreign gas and the ammonia mixed in directly before the reaction zone at temperatures of 200° to 400°C. The reaction conditions such as temperature, dilution of the gas and velocity of flow of the gas are so fixed suitably in connection with each other that the residence time in the reaction zone is 0.5 to 5.0 seconds, especially 0.8 to 2.5 seconds. The recovery of the pyridine and 3-methylpyridine from the reaction mixture takes place in conventional manner.

In the following examples the following terms are employed:

$$\text{Yield} = \frac{\text{Moles of Product Produced}}{\text{Moles of Acrolein Added}} \times 2 \times 100 \ (\%)$$

$$\text{Space-Time-Yield} = \frac{\text{Mass of Produced Product/Time}}{\text{Bulk Volume of the Catalysts}} \quad (\frac{g}{l \times h})$$

By the term "Product" is meant the sum of pyridine and 3-methylpyridine.

The gas volumes specified are based on the room temperature volumes.

Unless otherwise indicated, all parts and percentages are by weight.

EXAMPLE 1

1300 grams of aluminum oxide in the form of extruded objects having a diameter of 2 mm. and a length of 4 to 6 mm. and a surface area of 300 m²/g (BET) were treated with a solution of 160 grams (0.62 mole) of analytically pure magnesium nitrate hexahydrate [Mg(NO$_3$)$_2$ · 6H$_2$O] in 1000 ml of water and and 30 ml of concentrated nitric acid. The mixture was subsequently dried while it was held for 8 hours at 100° C. The dry material obtained was stirred with a solution of 35.6 grams (0.62 mole) of ammonium hydrogen fluoride in 1000 ml of water. This mixture was dried while it was held at 100° C. for 12 hours. The dry material was subsequently heated in an air stream for 4 hours at 700° C. The atomic ratio of Al to Mg to F was 1000:25:50.

There was led over 1 liter (bulk volume) of catalyst in uniform flow hourly a gas mixture of 840 grams (15.0 moles) of acrolein, 735 liters (30.6 moles) of nitrogen and 700 liters (29.2 moles) of ammonia. The ammonia gas was mixed with the acrolein-nitrogen mixture directly at the entrance of the reactor through a binary nozzle. The gases had an entrance temperature of 220° C. The catalyst was preheated to 390° C., in the course of the reaction the temperature was between 400° and 440° C. The reaction gases were washed with water. The product was continuously extracted from the washing fluid with methylene chloride. Fractional distillation of this extract hourly gave 140 grams (1.77 moles) of pyridine and 321 grams (3.45 moles) of 3-methylpyridine. The yield was 70%, the space-time-yield 461 grams/lxh.

EXAMPLES 2 to 5

The process was the same as in Example 1 except that there was produced and employed different catalysts. To produce the catalysts of Examples 2 to 5 the aluminum oxide was first treated with an aqueous nitric acid solution (same concentration as in Example 1) of the nitrate of the element of the second main group of the periodic system and after drying this mixture was treated with an aqueous solution of ammonium hydrogen fluoride as in Example 1. After drying, this mixture was heated for 4 hours in an air steam at the temperature set forth below.

The individual data are as follows:

EXAMPLE 2

Catalyst Produced From     1300 grams Al$_2$O$_3$
                                              160 grams Mg(NO$_3$)$_2$ · 6H$_2$O -continued

| | |
|---|---|
| Atomic ratio Al to Mg to F | 71.2 grams NH₄HF₂<br>1000:25:100 |
| Material Heated To | 720° C. |
| Hourly produced pyridine | 137 grams (1.73 moles) |
| Hourly produced 3-methylpyridine | 317 grams (3.41 moles) |
| Yield | 69% |
| Space-Time-Yield | 454 grams/1×h |

EXAMPLE 3

| | |
|---|---|
| Catalyst Produced From | 1300 grams Al₂O₃<br>163 grams Ba(NO₃)₂<br>35.6 grams NH₄HF₂ |
| Atomic Ratio Al to Ba to F | 1000:25:50 |
| Material Heated to | 660° C. |
| Hourly Produced Pyridine | 129 grams (1.63 moles) |
| Hourly produced 3-methyl-pyridine | 305 grams (3.28 moles) |
| Yield | 66% |
| Space-Time-Yield | 434 grams/1×h |

EXAMPLE 4

| | |
|---|---|
| Catalyst Produced From | 1300 grams Al₂O₃<br>320 grams Mg(NO₃)₂ . 6H₂O<br>71.2 grams NH₄HF |
| Atomic Ratio Al to Mg to F | 1000:50:100 |
| Material heated to | 700° C. |
| Hourly produced pyridine | 156 grams (1.97 moles) |
| Hourly produced 3-methyl-pyridine | 322 grams (3.46 moles) |
| Yield | 72% |
| Space-Time-Yield | 478 grams/1×h |

EXAMPLE 5

| | |
|---|---|
| Catalyst Produced From | 1300 grams Al₂O₃<br>148 grams Ca(NO₃)₂ . 4H₂O<br>35.6 grams NH₄HF |
| Atomic ratio Al to Ca to F | 1000:25:50 |
| Material Heated To | 650° C. |
| Hourly Produced Pyridine | 126 grams (1.60 mole) |
| Hourly Produced 3-methyl ɸpyridine | 288 grams (3.09 mole) |
| Yield | 63% |
| Space-Time-Yield | 414 grams/1×h |

EXAMPLE 6

A solution of 80 grams of magnesium nitrate hexahydrate in 10 liters of water at room temperature was treated with a solution of 18 grams of ammonium hydrogen fluoride in 50 ml of water. Thereby there was formed a slightly turbid gelatinous suspension of magnesium fluoride. There were introduced into this 870 grams of hydrated aluminum oxide which had an Al₂O₃ content of 75% and a bulk density of 690 grams/liter. The mixture was stirred for 2 hours and then brought to dryness on a roller drier. The dry material was mixed with 3 weight % of graphite and pressed into tablets having a diameter of 5 mm. and a height of 3 mm., which tablets had a radial breaking strength of 6 kgf. The tablets were held at 450° C. for 4 hours in the presence of air and then held for a further 4 hours in air at 680° C. The atomic ratio of Al to Mg to F was 1000:25:50. The product was treated further as in Example 1. There were recovered hourly 144 grams (1.83 moles) pyridine and 312 grams (3.36 moles) of 3-methylpyridine. The yield was 69%, the space-time-yield 456 grams/lxh.

It may be noted that Mg, Ca, Sr, and Ba are elements of the second main group of the periodic system having an atomic weight of 24 to 137.

We claim:

1. A catalyst suitable for the reaction of acrolein with ammonia to form pyridine and 3-methylpyridine, said catalyst having been prepared by heating at 600° to 800°C. in the presence of gaseous oxygen (1) aluminum metal, aluminum oxide or a compound of aluminum convertible to the oxide upon heating with gaseous oxygen at 600° to 800°C., (2) ammonium fluoride, hydrogen fluoride or a fluoride of an element of the second main group of the periodic system and (3) at least one element of the second main group of the periodic system, the oxide of said element or a compound of said element convertible to the oxide in the presence of gaseous oxygen at a temperature of 60° to 800°C., said catalyst consisting essentially of the elements Al, F, O and the element of the second main group of the periodic system.

2. A catalyst according to claim 1 wherein the element of the second main group is selected from the group consisting of Mg, Ca, Sr and Ba.

3. A catalyst according to claim 2 wherein the atomic ratio of Al to F is between 1,000 to 10 and 1,000 to 800.

4. A catalyst according to claim 3 wherein the atomic ratio of Al to the elements of the second main group together is between 1,000 to 5 and 1,000 to 200.

5. A catalyst according to claim 4 wherein the atomic ratio of Al to F is between 1,000 to 20 and 1,000 to 400 and the atomic ratio of Al to the elements of the second main group of the periodic system is between 1,000 to 10 and 1,000 to 100.

6. A catalyst according to claim 5 wherein the atomic ration of ratio to F is between 1,000 to 25 and 1,000 to 50 and the atomic ratio of Al to the elements of the second main group of the periodic system is between 1,000 to 50 and 1,000 to 100.

7. A catalyst according to claim 1 wherein (1) is aluminum oxide or said compound of aluminum convertible to the oxide upon heating with gaseous oxygen at 600° to 800°C.

8. A process of preparing the catalyst of claim 1 comprising preparing a mixture of (1), (2) and (3) and heating said mixture with oxygen at 600° to 800°C.

9. A process according to claim 8 where (1) is aluminum oxide or a compound which is convertible to aluminum oxide upon heating with oxygen, (2) is ammonium fluoride, ammonium hydrogen fluoride or hydrogen fluoride and (3) is the oxide of the element or a salt of the element which is convertible to the oxide upon heating with oxygen.

10. A process according to claim 9 wherein the ratio of Al to F is from 1,000 to 10 up to 1,000 to 800 and the ratio of Al to the element of the second main group of the periodic system is from 1,000 to 5 up to 1,000 to 200.

11. A process according to claim 8 wherein (1) is aluminum oxide or a compound which is convertible to aluminum oxide upon heating in oxygen and (2) and (3) together are the fluoride of an element of the second main group of the periodic system having an atomic weight of 24 to 137.

12. A process according to claim 11 wherein the ratio of Al to F is from 1,000 to 10 up to 1,000 to 400 and the ratio of Al to the element of the second main group of the periodic system is from 1,000 to 5 up to 1,000 to 200.

13. A process according to claim 8 wherein the mixture of (1), (2) and (3) is prepared in water.

14. A catalyst according to claim 1, wherein (3) is the oxide of said element of the second main group of the periodic system.

15. A catalyst according to claim 1, wherein (3) is a compound of said element of the second main group of the periodic system convertible to the oxide.

* * * * *